(12) United States Patent
Moore et al.

(10) Patent No.: US 10,823,344 B2
(45) Date of Patent: Nov. 3, 2020

(54) PORTABLE DECORATIVE LANTERN AND RELATED METHODS

(71) Applicant: HeathCo LLC, Bowling Green, KY (US)

(72) Inventors: Kenneth R. Moore, Bowling Green, KY (US); Scott Blaise Tylicki, Bowling Green, KY (US); Leeman Elliot Stevens, Bowling Green, KY (US); Amer Salihovic, Bowling Green, KY (US); John Colvin Deaton, Bowling Green, KY (US); Stephen Brett Thompson, Peachtree Corners, GA (US)

(73) Assignee: HEATHCO LLC, Bowling Green, KY (US)

( * ) Notice: Subject to any disclaimer, the term of this patent is extended or adjusted under 35 U.S.C. 154(b) by 0 days.

(21) Appl. No.: 16/234,872

(22) Filed: Dec. 28, 2018

(65) Prior Publication Data

US 2019/0203890 A1    Jul. 4, 2019

Related U.S. Application Data

(60) Provisional application No. 62/611,394, filed on Dec. 28, 2017.

(51) Int. Cl.
| | |
|---|---|
| *F21L 4/08* | (2006.01) |
| *F21V 23/06* | (2006.01) |
| *F21V 23/00* | (2015.01) |
| *F21V 33/00* | (2006.01) |
| *F21V 23/04* | (2006.01) |

(Continued)

(52) U.S. Cl.
CPC ............. *F21L 4/08* (2013.01); *F21S 8/033* (2013.01); *F21S 9/03* (2013.01); *F21V 23/003* (2013.01); *F21V 23/0435* (2013.01); *F21V 23/06* (2013.01); *F21V 33/0056* (2013.01); *H05B 45/10* (2020.01); *H05B 45/20* (2020.01); *H05B 47/105* (2020.01); *F21V 23/0464* (2013.01); *F21V 23/0471* (2013.01); *F21W 2121/00* (2013.01); *F21Y 2113/13* (2016.08); *F21Y 2115/10* (2016.08)

(58) Field of Classification Search
CPC .......... F21S 8/036; F21L 4/08; F21V 23/0442
See application file for complete search history.

(56) References Cited

U.S. PATENT DOCUMENTS

| | | | | |
|---|---|---|---|---|
| 5,645,341 | A * | 7/1997 | Liao | F21L 4/08 |
| | | | | 362/183 |
| 6,040,780 | A * | 3/2000 | Lucas | G08B 21/02 |
| | | | | 340/321 |

(Continued)

OTHER PUBLICATIONS

Coleman, Coleman Quad Pro LED Lantern, Dicks Sporting Goods, www.dickssportinggoods.com, Retrieved on Aug. 22, 2017.

*Primary Examiner* — Diane I Lee
*Assistant Examiner* — Zachary J Snyder
(74) *Attorney, Agent, or Firm* — Middleton Reutlinger

(57) ABSTRACT

Methods and apparatus for a decorative lantern having a portable lantern and cradle is set forth. Both the portable lantern and the cradle may include a light source. The mounted cradle includes a power source capable of recharging and/or powering the portable lantern when docked. The light source of the cradle may be illuminable when the portable lantern is removed from the cradle.

20 Claims, 5 Drawing Sheets

(51) Int. Cl.

| | |
|---|---|
| *F21S 8/00* | (2006.01) |
| *F21S 9/03* | (2006.01) |
| *H05B 45/10* | (2020.01) |
| *H05B 45/20* | (2020.01) |
| *H05B 47/105* | (2020.01) |
| *F21W 121/00* | (2006.01) |
| *F21Y 115/10* | (2016.01) |
| *F21Y 113/13* | (2016.01) |

(56) References Cited

U.S. PATENT DOCUMENTS

| | | | |
|---|---|---|---|
| 6,663,265 B2 | 12/2003 | Kovacik et al. | |
| 7,097,322 B2 | 8/2006 | Shuniak | |
| 7,204,619 B2 | 4/2007 | Sherer | |
| 8,087,797 B2 | 1/2012 | Pelletier et al. | |
| 8,662,699 B2 | 3/2014 | Tarter | |
| 2005/0194930 A1* | 9/2005 | Barbeau | F21L 2/00 320/116 |
| 2009/0135611 A1 | 5/2009 | Lin | |
| 2010/0039792 A1 | 2/2010 | Meyers et al. | |
| 2011/0012518 A1* | 1/2011 | Tarter | F21L 2/00 315/160 |
| 2011/0058361 A1 | 3/2011 | Houghton | |
| 2013/0215603 A1* | 8/2013 | Chien | F21L 4/08 362/183 |
| 2015/0055330 A1* | 2/2015 | Xu | F21S 2/00 362/183 |

\* cited by examiner

PORTABLE DECORATIVE LANTERN AND RELATED METHODS

TECHNICAL FIELD

The present invention is directed generally to a two-part decorative lantern having a wall mounted location. More particularly, various inventive methods and apparatus disclosed herein relate to providing a decorative lantern having a portable lantern separable from a cradle's wall mounted location.

BACKGROUND

Typical wall mounted luminaires are commonplace for outdoor environments. Typically, such luminaires are fixed in location and do not allow a user to separate a portable portion of the luminaire to illuminate a different zone or remote position.

SUMMARY

The present disclosure is directed to a decorative lantern having a portable lantern separable from the wall mounted cradle and related methods as well as an associated decorative lantern control. More particularly, various inventive methods and apparatus disclosed herein relate to providing a portable lantern apparatus that has portable mode and mounted mode. As well, the various methods and apparatus disclosed herein further relate to varying the intensity and/or color or other characteristics for the corresponding position of the portable lantern relative to the cradle.

In implementations, the decorative lantern and related methods disclosed herein may also optionally change illumination and/or color levels from a first intensity and/or color light output to a second intensity and/or color light output based on detected proximity or movement of an individual, object or other triggering event such as the position of the portable lantern in relationship to the cradle. In some implementations, providing a change in color and/or intensity upon removal of the portable lantern from the cradle may allow the user to create a different aesthetic lighting and/or bug deterrent. In embodiments, removal of the portable lantern from the cradle, for example, the decorative lantern controller may increase the lighting level to the second increased intensity and/or change color temperature. However, in other implementations, removal of the portable lantern from the cradle may decrease the light intensity and/or change the color.

Alternatively, in some implementations, the decorative lantern or portions thereof may have a first variable light intensity output or a second variable light intensity output upon detection of motion or proximity to the unit or whether the lantern is in a portable mode and/or wall mounted mode. Hence, the portable lantern and/or the cradle may provide a color and/or intensity illumination or other characteristic upon detection of being on and/or off the cradle.

As one example, in some embodiments a decorative lantern may be provided with one or more light sources, a decorative lantern controller, light sensor, rechargeable batteries, docking sensor, and/or a motion/proximity sensor. The decorative lantern controller may control the light output of the one or more light sources based upon detection of signals from the docking sensor one or more motion/proximity sensor such as a PIR for example, as well as other sensor input, such a light sensor such as a photocell sensor.

In some aspects the illumination source is an LED and the decorative lantern controller includes an LED driver or other control electronics. In various aspects, the LEDs are positioned on a single or a plurality of portions of the decorative lantern (e.g. cradle and/or portable lantern). In other aspects, the decorative lantern controller can energize individual, all or segmented ones of the LEDs in each of the decorative lantern light sources. In further aspects, the decorative lantern controller can modulate the light to vary the illumination level output of the LEDs, color, color temperature and otherwise modify light output.

In lighting units such as those that include LED-based light sources, it is desirable to have control over one or more light sources of the lighting unit. For example, it may be desirable to control which of one or more light sources/LEDs are illuminated and/or to control one or more lighting parameters of one or more of the light sources. For example, it may be desirable to control color, color temperature, intensity, power consumption, beam width, and/or beam direction of light output provided by one or more LED-based light sources of an LED-based lighting unit. Such control is implemented in the various aspects described herein.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" or "illumination source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "lighting fixture" or "decorative lantern" is used herein to refer to an implementation or arrangement of one or more lighting units in a particular form factor, assembly, or package. The term "decorative lantern" is used herein to refer to an apparatus including one or more light sources of same or different types. A given unit may have any one of a variety of mounting arrangements for the light source(s), enclosure/housing arrangements and shapes, and/or electrical and mechanical connection configurations. Additionally, a given unit optionally may be associated with (e.g., include, be coupled to and/or packaged together with) various other components (e.g., control circuitry) relating to the operation of the light source(s). An "LED-based decorative lantern" refers to a lighting unit that includes one or more LED-based light sources as discussed above, alone or in combination with other non LED-based light sources. A "multi-channel" lighting unit refers to an LED-based and/or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), field-programmable gate arrays (FPGAs), and discrete logic.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
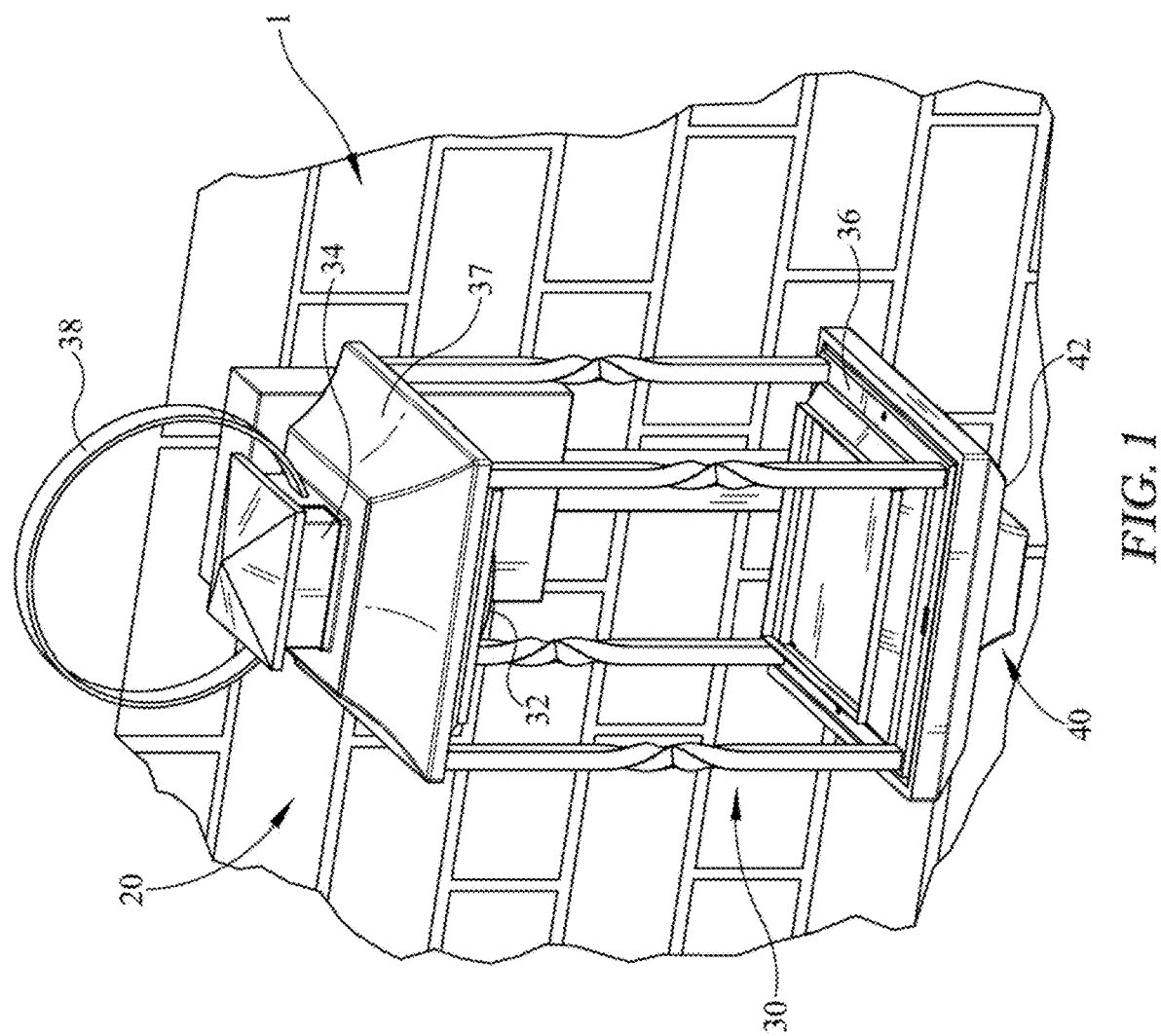
FIG. 1 illustrates an example decorative lantern mounted to an object (e.g. wall) illustrating an embodiment of a portable lantern in a mounted mode with a cradle as described herein.

The present disclosure sets forth various design implementations for a decorative lantern luminaire which can provide illumination directly at the wall mount location and which includes a portable lantern portion which can be removed from the wall mount portion. Due to the portable nature of the removable lantern, the lantern may be partially or fully charged at the wall mount and then removed to be positioned in a remote place where there is no access to standard line voltage. The portable lantern may have a battery powered electrical supply which may be recharged at the wall mounting station and both the portable lantern and the wall mount portion may have, in implementations, separately controllable illumination sources for specialized lighting characteristics necessary in the individual environments of the wall mount location and the portable lantern. This disclosed portable lantern or portions thereof may include motion or proximity detection sensors in order to detect movement such that upon detection of motion, the lighting controller may activate illumination sources on the base so that the area around the base may be illuminated. The decorative lantern or portions thereof may in embodiments, include a light sensor, for example such as a photocell, to detect environmental lighting such that the one or more light sources are operated upon the detection of dusk and/or night condition. The lighting controller may receive as input the light sensor output to determine ambient light and modify the luminaire light output intensity accordingly. Further, in embodiments, a docking sensor may detect the status or location of the portable lantern relative to the cradle to illuminate the one or more light sources upon detection of the portable lantern portion being placed into the wall mount charging cradle or mounting portion.

In various embodiments, the portable lantern power may be applied by virtue of one or more cradles in the wall mount which may provide required voltage and/or modified electrical power to recharge batteries of the portable lantern. By returning the portable lantern to the cradle or stowed position/configuration, the cradle can be used to recharge the rechargeable battery system of the portable lantern.

In various implementations, the decorative lantern and wall mount base unit can incorporate LEDs as the illumination source due to their lower power load requirements and high illumination output and other drivable characteristics.

In various implementations using one or more LED light sources, a lighting control and LED driver may be implemented to control the one or more LEDs and their individual parameters. For example, it may be desirable to individually control intensity, color, color temperature, beam width, and/or beam direction of light output provided by one or more LED-based light sources of an LED-based lighting unit.

The presently described portable lantern and wall mounted base unit work in combination to provide an independently powered portable lantern while also functioning at a wall mount location as well as controlling one or more lighting parameters of one or more of the light sources based on motion detection, current external light conditions, portable mode and/or wall mounted mode, or other conditions.

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatus and methods may be omitted so as to not obscure the description of the representative embodiments. Such methods and apparatus are clearly within the scope of the claimed invention. For example, aspects of the methods and apparatus disclosed herein are described in conjunction with a decorative lantern unit having a portable lantern and cradle with one or more illumination sources. However, one or more aspects of the methods and apparatus described herein may be implemented in other units that have alternative configurations. Implementation of the one or more aspects described herein in alternatively configured environments is contemplated without deviating from the scope or spirit of the claimed invention.

The figures illustrate an example of a decorative lantern 20 with a portable lantern 30 removable from a cradle 40 fixedly mounted to a wall or object 1. The portable lantern 30 releaseably secures to the cradle 40 between a stowed or home position/configuration (FIG. 1) where the cradle 40 receives the portable lantern 30 and a deployed position/configuration (FIGS. 2 and 3) wherein the portable lantern 30 may be detached and moved to a remote location to illuminate another area or different zone than when in the stowed configuration. The decorative lantern 20 may include one or more light sources, such as for example, one or more individually controllable LEDs. In embodiments, the portable lantern 30 includes one or more first light heads, lamps, or sources 32 and the cradle 40 includes one or more second light heads, lamps, or sources 42 such as for example one or more LEDs. However, in some embodiments, the cradle may not have a light source. Although the cradle 40 in the embodiment shown is receiving the base 36 of the portable lantern 30, it should be understood that the cradle may be a variety of constructions, shapes, and sizes and still receive and connect with the portable lantern in a variety of ways. For example, the portable lantern 30 may removeably connect at a top 37 and/or side to the cradle. For example, the top 37 of the portable lantern 30 may hang or depend from the cradle 40 in some embodiments (e.g. hanging fixture). It should also be understood that the portable lantern 30 may be a variety of constructions, quantities, shapes, and sizes and still be used within the scope of the invention.

Figure 2:
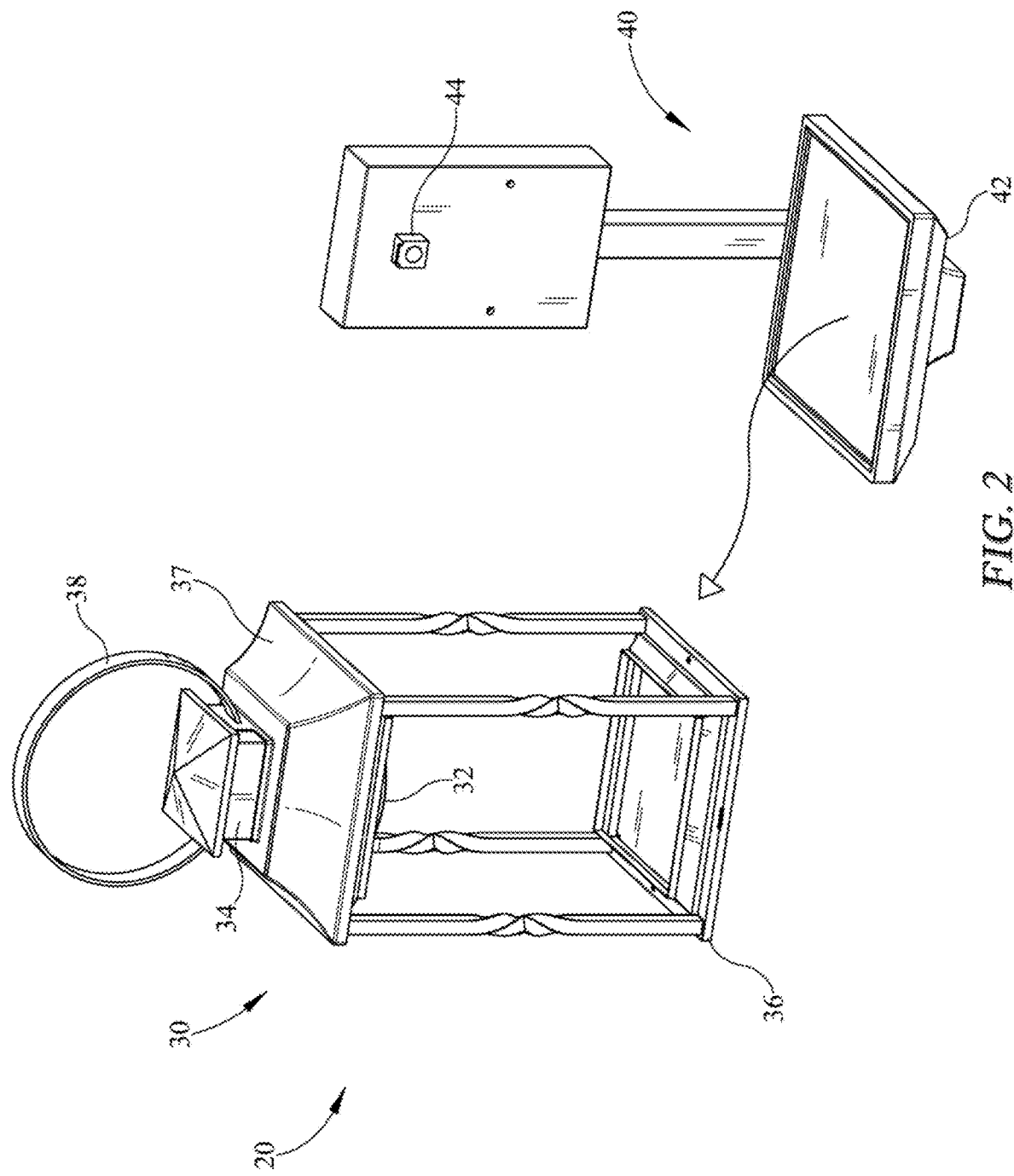
FIG. 2 illustrates a top perspective view of the decorative lantern of FIG. 1 illustrating the portable lantern separated from the cradle in a portable mode.
Figure 3:
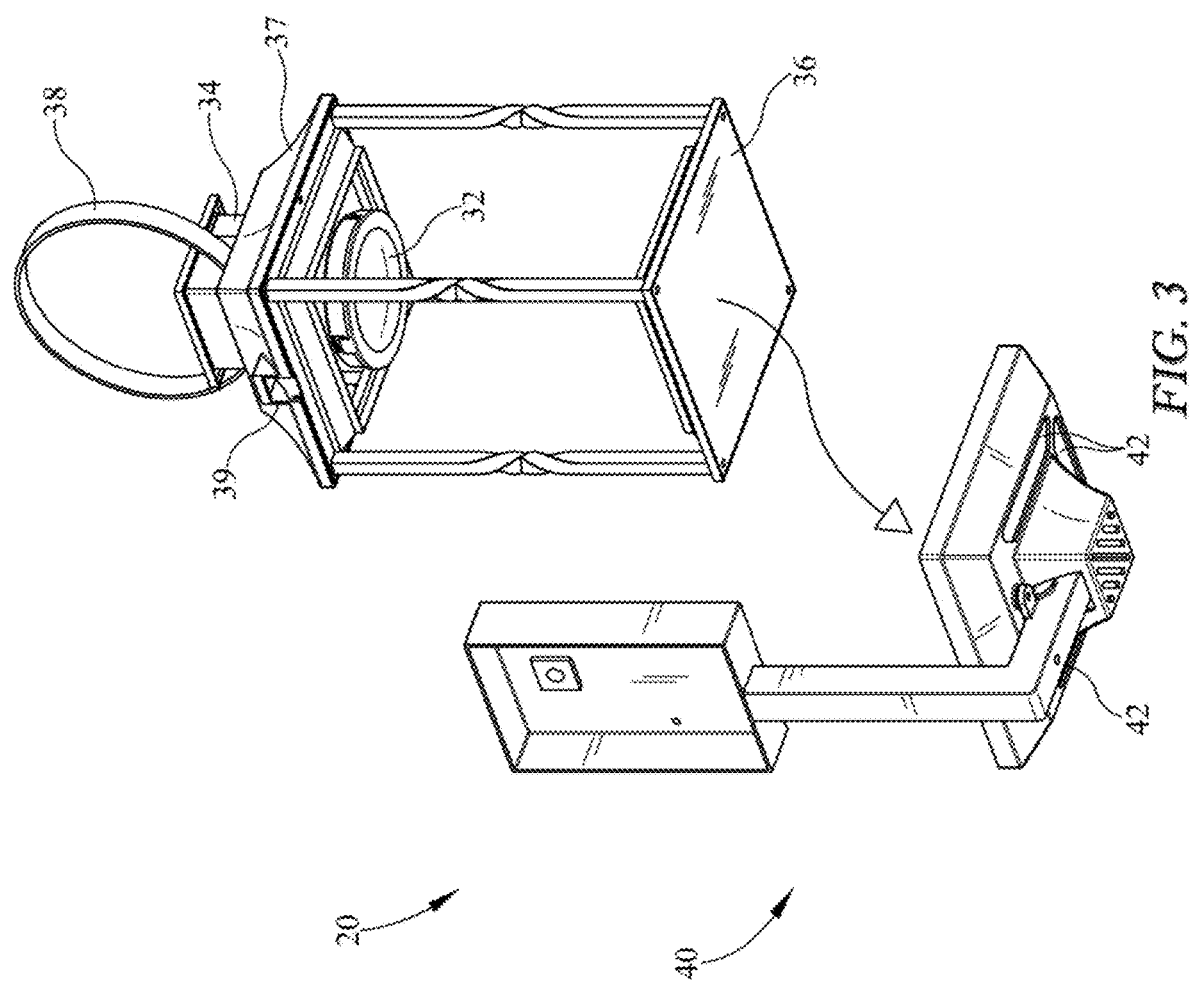
FIG. 3 illustrates a bottom perspective view of the decorative lantern of FIG. 2 illustrating the portable lantern separated from the cradle.
Figure 5:
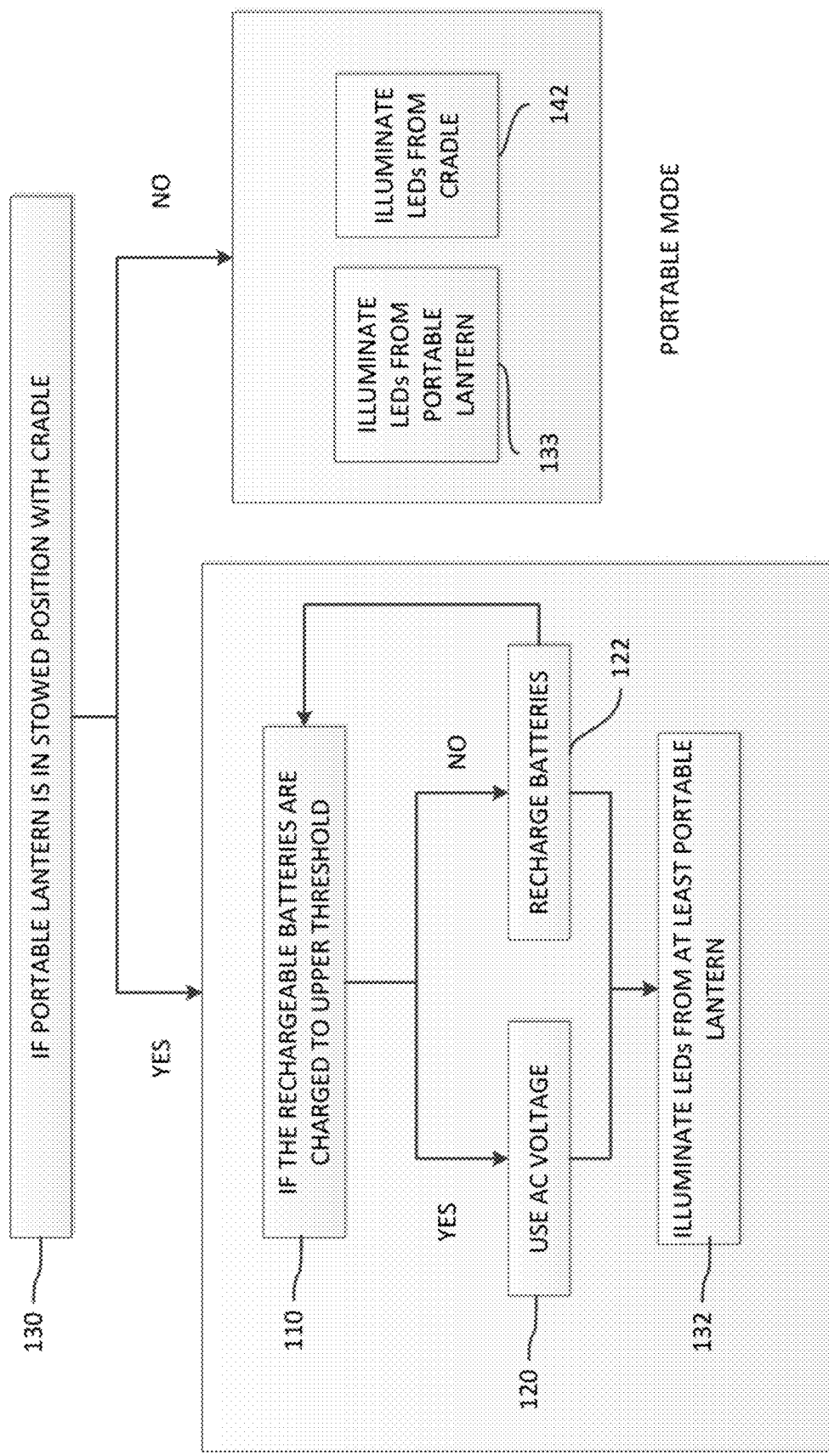
FIG. 5 illustrates a flow chart of an example of the method for normal operation of the decorative lantern for operation and recharging of the batteries.

In embodiment, the decorative lantern 20 includes a portable mode and a mounted mode. The portable mode occurs when the portable lantern 30 is in the deployed configuration as shown in FIGS. 2, 3, and 5. When in the portable mode, in some embodiments the portable lantern 30 and cradle 40 illuminate (e.g. automatically and/or manually) from the first light source 32 and second light source 42, respectively. In some embodiments, the second light source 42 of the cradle 40 may not illuminate in the portable mode. The mounted mode occurs when the portable lantern 30 is in the stowed position with the cradle as shown in FIGS. 1 and 5. When in the mounted mode, the first light source 32 of the portable lantern 30 may illuminate (e.g. manually and/or automatically) and the second light source 42 of the cradle 40 may not illuminate. However, in some embodiments, the second light source may be illuminable when in the mounted mode (e.g. manually and/or automatically). For example, the second light source may illuminate with or without the first light source when in the mounted mode.

In implementations, the cradle 40 may include a proximity sensor or other electronics to detect the presence of the portable lantern 30. In aspects, this proximity sensor may include magnets, active or passive scanning devices, RFID, optical detection combined with bar codes or other detectable optical indicator, or other device. For example, in some embodiments, a magnetic field detector may be placed near the cradle 40 which receives the portable lantern 30. A permanent magnet or electro-magnet may be positioned on the lower end of the portable lantern and aligned with the detector of the cradle. Upon positioning of the portable lantern in the cradle, the luminaire controller may detect the presence of the lantern within the cradle by accepting a signal from the detector and modify the light output of both the mount and the lantern to customizable settings.

In implementations, the decorative lantern 20 may include at least one motion detector 34 which may include a sensor protected by a lens such that detection of motion, within a detection range, triggers the portable lantern 30 and/or cradle 40 to place the one or more LEDs of the light sources 32 and/or 42 in an standard or higher illumination mode depending upon the current status of the luminaire, such as, for example when in the stowed configuration and/or the deployed configuration. For example, the portable lantern may include a PIR or other motion sensor which detects temperature and thus motion of a body and/or animal, The PIR output may be directed to a controller or other microprocessor that controls the illumination level and control of the LEDs or other illumination sources in the portable lantern.

In alternative configurations, the motion detection system may be placed on the mounting portion 40 so that the portable lantern battery system does not have to charge and/or monitor for motion. In such an example, the motion detection sensor may be, in implementations, positioned on an outwardly facing surface and connected electronically to a lighting controller or other microprocessor in the mounting portion 40 in order to alter the output light characteristics of either or both the mounting portion cradle 40 or the portable lantern 30.

In embodiments, the motion sensor may be in electrical communication with the lighting controller or microprocessor on either the port lantern or the mounting portion cradle. In implementations, the two parts of the luminaire system disclosed herein may be in electronic communication with transmitters and receivers on either the cradle or lantern. In examples, upon detection of motion at either the cradle or the lantern, a communication signal may be transmitted to the other unit so that it is recognized that a different 'motion detect' state has been determined. In other implementations, motion detectors may be present on both devices.

The light sources 32 and 42 of the cradle 40 and/or portable lantern 30 may each have at least one LED which are each individually addressable by a lighting controller 50. The LEDs may be any of a number of configurations, color, intensity level and the like and may be directly controlled by the decorative lantern controller thru LED drivers or other associated electronics The LEDs may be controlled by a controller which may electrically control and drive the LEDs for appropriate and desired illumination characteristics. Various implementations for a lighting controller for the LEDs include an LED driver. The electronic drivers of the LEDs may be utilized including microprocessors, the linear AC drivers are constant current regulators. In other embodiments, the linear AC drivers are ASICs. Other drivers may be used. The LEDs may be provided as arrays, individual emitters, any of which may be directly addressable and hence drivable by control and/or micro-processors and included programming stored on available and accessible memory. Such may include in implementations, current regulators, voltage regulators, micro-controllers and other known circuitry to maintain illumination levels and other characteristics of the LEDs.

In implementations, LEDs of both the cradle and the lantern may be connected to a power supply which provides electrical power to each LED on the respective platform. The power supply utilized in the cradle, for example, may include standard line voltage which may be fed to a converter to provide adequate and appropriate electrical supply to the individual LEDs via driving circuits, as discussed herein. The power supply may accept standard 120V AC line voltage and modify it accordingly to provide to the individual LEDs. Such modifications may include AC to DC conversion, PWM drivers, smoothing or chopping circuits and the like as are well-known in the art to provide adequate power to the LEDs.

In implementations, the LEDs of the portable lantern may be connected to a rechargeable battery system which provides adequate DC power directly to the at least one LED on the lantern. However, such power supply and lighting control may include other electronics and or programming, if implemented with a microprocessor and stored instructions on memory, to reduce and/or maintain lighting output of the portable lantern during high drain and/or extended use. In implementations, such specialized control may include modulation techniques and or other control systems to reduce the energy requirements of the at least one LED on the portable lantern.

Various implementations for drivers of the LEDs may be utilized including microprocessors, the linear AC drivers are constant current regulators. In other embodiments, the linear AC drivers are ASICs. Other drivers may be used. The LEDs may be provided as arrays, individual emitters, any of which may be directly addressable and hence drivable by control and/or micro-processors and included programming stored on available and accessible memory. Such may include in implementations, current regulators, voltage regulators, micro-controllers and other known circuitry to maintain illumination levels and other characteristics of the LEDs.

As shown in FIG. 1-3, the cradle 40 receives the portable lantern 30 in the stowed position. The portable lantern further may be removable from the cradle to transport the portable lantern 30 from the cradle to another remote position. In some embodiments, the portable lantern 30 may be moved to another cradle in a different mount location.

Figure 4:
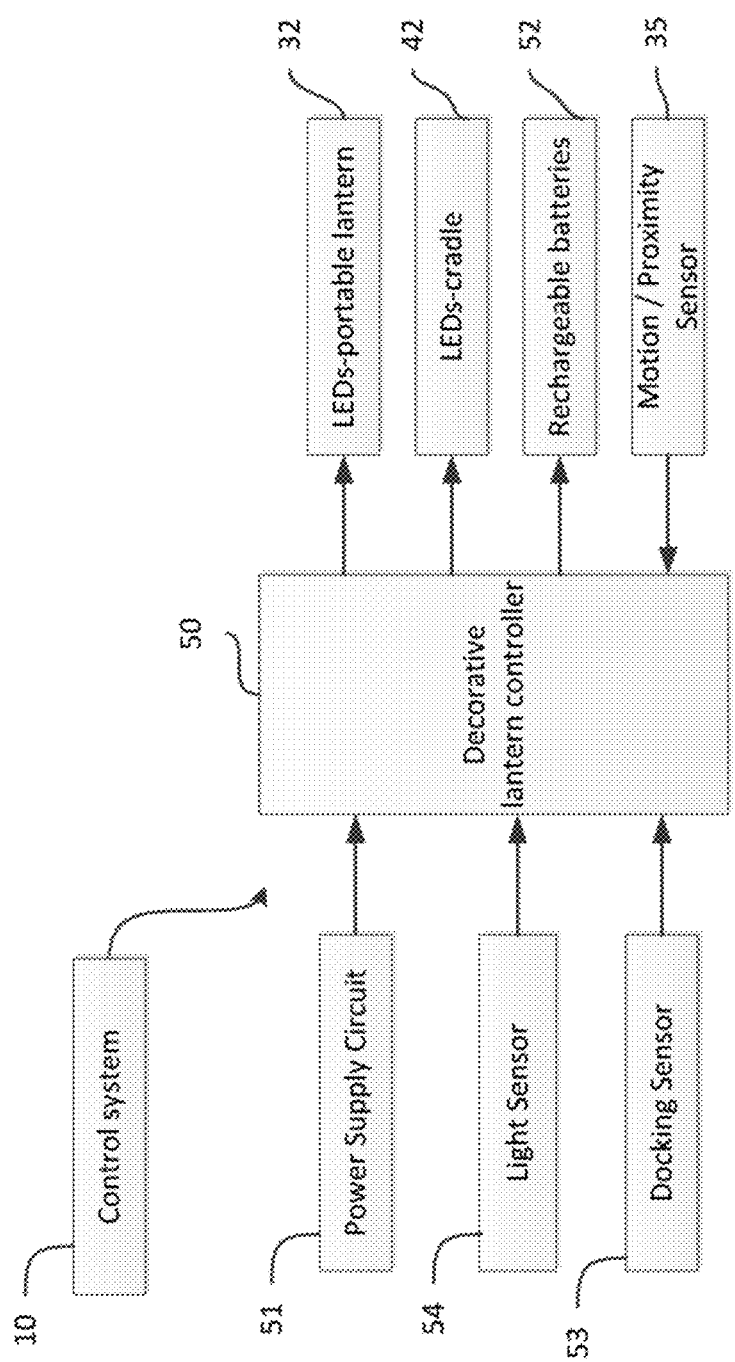
FIG. 4 illustrates a block diagram of an embodiment of the decorative lantern of FIG. 1.

The portable lantern 30 may include a rechargeable battery 52 to power the light source 32 and the LEDs. The rechargeable battery may be, for example, lithium-ion. The rechargeable battery 52 and the electrical/mechanical connection may be a variety of locations between the cradle 40 and the portable lantern 30. For example, a base 36 and/or top 37 of the portable lantern 30 may include the one or more rechargeable batteries. The power supply circuit 51 through the mounted cradle 40 may recharge the rechargeable batteries contained within the portable lantern. As depicted in FIG. 4, the cradle 40 is electrically connected to the power supply circuit or source 51 such that the decorative lantern controller 50 can control the recharging of the rechargeable battery 52, dependent upon operating conditions of the decorative lantern, cradle 40, portable lantern 30, portable and/or mounted modes, and other factors.

In some embodiments, the portable lantern 30 may include the base 36 and the opposing top 37. The one or more light sources 32 may be include in the base 36 and/or top 37. In the one embodiment shown, the light source 32 is included in the top 37. The top 37 may include a handle 38. The base 36 may be received by a portion of the wall mounted cradle 40. As shown in the one embodiment, the top 37 or other portions may include a receiver 39 for temporarily coupling to a pin or catch 44 on the cradle 40 when in the stowed configuration and/or mounted mode. The electrical and/or mechanical connectivity of the portable lantern with the cradle may occur through the base, handle, and/or top, or other portions thereof. Electrical connection may also include wireless inductive charging.

In some embodiments, a motion/proximity detector 34 may, in various examples, be positioned within one or more portions of the decorative lantern. The one or more motion detectors may be included in the cradle and/or portable lantern 20. In some embodiments, one or more of the motion detectors may be adjustably positioned relative to their respective portion of the decorative lantern and aimed towards high traffic areas or desired locations. One or more motion detectors 34 may be operable during the portable mode and/or mounted mode. The motion/proximity detector 34 may include at least one motion/proximity sensor 35 and in some instances, two sensors in order to increase accuracy and depth perception. The sensors 35 may include a PIR (infra-red passive) sensor that detects a heat source for activation of one or more light sources. The PIR of the motion detector may also be combined with a Fresnel lens and other structures to focus light and/or radiation to the opening allowing input to the sensor electronics.

The motion detector 34 may provide sensor output that may be utilized by the controller 50 to determine presence of a user and/or other object within a threshold distance of the detector. In some embodiments the motion sensor 35 output may be a true/false output that indicates presence and/or non-presence of a user and/or other object within a threshold distance of the sensor. For example, in some embodiments the sensor output may be a "true" value (e.g., a first voltage) when a user and/or other object is within a threshold distance of the sensor and may be a "false" value (e.g., a second voltage or no voltage) when a user and/or other object is not within a threshold distance of the sensor. In some embodiments the sensor output may include more than two values. For example, each value may indicate an estimated distance of the nearest user and/or other object and the controller 50 may utilize the value to determine if the estimated distance satisfies a threshold distance. Alternatively the sensor may include a plurality of sensors used to determine and filter false positives or regulate sensed input. Also, for example, each value may indicate a likelihood that a user and/or other object is within a threshold distance of the proximity sensor and the controller 50 may utilize the value to determine if the likelihood satisfies a threshold likelihood.

The motion detector 34 may include one or more apparatus that utilize one or more techniques to provide output that may be utilized by the controller 50 to determine presence of a user and/or other object within a threshold distance of the detector 34. The detector 34 may include one or more components that may be coupled to and/or embedded in one or more components of the decorative lantern 20 such as a heatsink of the lantern 20, a bulb type housing of lantern 20, or other functionally relate component. In some embodiments the motion detector 34 may be coupled to and/or embedded in an outer periphery of the lantern 20 or in a location that enables transmission and/or receipt of signals through a light exit window or lens of the lantern (e.g., a transparent or translucent bulb type housing).

For example, in some embodiments the motion detector 34 may be a capacitive sensor that utilizes a heatsink and/or a transparent patch of indium tin oxide (ITO) on an outer surface of the lantern 20 as a key. Also, for example, in some embodiments the motion detector 34 may be an ultra-sonic Doppler transmitter and receiver that uses time of flight techniques to determine distance to an object. Also, for example, in some embodiments the detector 34 may be a radar transmitter and receiver that uses time of flight techniques to determine distance to an object. Also, for example, in some embodiments the motion detector 34 may be an infra-red reflection distance sensor receiver that measures distance to an object. Also, for example, in some embodiments the detector 34 may include an infra-red passive sensor (PIR) that detects a heat source (such as a user's hand). Also, for example, in some embodiments the detector 34 may be light reflection sensor that detects presence and/or distance of an object based on reflections of light output of the light sources 32, 42. Also, for example, in some embodiments the detector 34 may be a camera and one or more signals from the camera may be utilized to detect presence and/or distance of an object. For example, signals from a depth camera may be utilized to determine an object in the shape of a person or vehicle is approaching. Also, for example, signals from a camera may be utilized to determine movement and the movement may be assumed or determined to be human movement. Also, for example, signals from a camera may be utilized to determine presence of a heart beat for example, by monitoring changes in reflected light from a hand and/or other body part of a user. In some embodiments a proximity sensor may include one or more controllers to determine presence, distance, and/or other values. In some embodiments controller 50 may additionally and/or alternatively determine presence, distance, and/or other values based on motion detector input provided by the motion/proximity detector 34.

In some embodiments, any threshold distance utilized by the motion detector 34 and/or the controller 50, and/or a detection range of the sensor may be set to a distance so that false positives are minimized. For example, in some embodiments a threshold distance and/or a range of the motion detector 34 may be set to less than 35 ft. or may be a minimum and maximum range of both outward distance and rotational or coverage angle.

As described herein, in some embodiments the decorative lantern 20 or portions thereof may integrate the motion detector 34, the controller 50, light sensor 54, docking sensor 53, the light sources 32 and 42, and the cradle 40, and portable lantern 30 in a cohesive package. In other embodiments one or more of the sensors or motion detector 34, the controller 50, and/or light sources 32, 34 may be provided separate from the portable lantern 30 and/or cradle 40. For example, the controller 50 may be provided remote from the portable lantern/cradle and may be in communication (e.g., wired or wireless communication) with the sensors, motion detector 34, docking sensor 53, the light sources 32, 42, and/or a drivers for the LEDs.

The decorative lantern controller 50 may control the connection of the cradle 40 and/or power supply circuit 51 to the rechargeable battery in order to control recharging and current flow thereto. Various known technologies in circuitry are provided for the converting of the AC power to the appropriate voltage necessary for recharging the rechargeable batteries and may further include a power converter and over-voltage protection circuit. Further, voltage converters may be provided to convert the voltage to an appropriate range to supply power to the various recharge and power supply circuits contained within the decorative lantern 20, cradle, portable lantern, or elsewhere.

As shown in FIGS. 4 and 5 a rechargeable battery 52 may be connected to the power supply circuit 51 contained within the portable lantern 30 housing and which may be controlled by the controller 50, depicted in the block diagram of FIG. 4. The power supply circuit may or, on some embodiments, may not be incorporated within a control system 10 depending on the overall configuration and requirements of the electronics for the decorative lantern system. In some embodiments, the supply circuit 51 may simply be a switch or other device operably connecting and disconnecting the electrical input from the AC voltage of the cradle to the rechargeable battery, one or more light sources, etc. In other embodiments, the power supply circuit may be directly integrated within the decorative lantern controller for control of the electrical flow path between the AC voltage and the rechargeable battery. In still other embodiments, the power supply circuit may be integrated electronics which operably connect either of the rechargeable battery to the load, the load being the illumination sources and other electronics. In various configurations, the decorative lantern controller may integrate such power supply components and logic within the controller, associated with the controller or in separate functional components to achieve the same operable connectivity and electronic supply of power to the various components of the system.

Returning to FIG. 4, a block diagram is provided for an exemplary embodiment of the decorative lantern elements, including the control system 10 which may include the decorative lantern controller 50, power supply circuit 51, docking sensor 53, light sensor 54, as well as motion/proximity sensors 35. The controller 50 of the control system 10 may be in electrical connection to the individual LEDs and thereby directly addresses the individual LEDs in the separate lamp heads or sources 32, 42 may address them all in unison or in any desired segment, or may address them in their respective portable and/or mounted mode. Various LED drivers may be incorporated within the LEDs or as necessary, within the decorative lantern controller or other displaced electronics. Color, brightness, direction and other control may be implemented through the controller 50.

In some embodiments, the docking sensor 53 communicates with the controller 50 to control the light sources 32 and/or 42 and/or recharging of batteries 52. The docking sensor or other device may provide the relative position of the portable lantern 30 in relation to the cradle 40 indicating the location of the portable lantern in the stowed configuration and/or the deployed configuration. The docking sensor may control the light sources 32 and/or 42 for each of the portable mode and the mounted mode. For example, a magnet may close a circuit to deactivate the cradle light source when the portable lantern is in the stowed position. In some embodiments, the docking sensor may activate the portable lantern and the cradle when in the deployed configuration or portable mode. Moreover, in some embodiments, the docking sensor may communicate with the controller 50 to recharge the batteries 52, utilize the power source directly 51, and/or illuminate the portable lantern and/or cradle based upon the one or more configurations/modes.

In some embodiments the LEDs are driven by one or more drivers and the controller 50 communicates with the one or more drivers to control the LEDs of the light sources 32 and/or 42. In some embodiments the controller 50 may form part of the driver for light sources 32 and/or 42. In some embodiments, such as those where the controller 50 is provided remote from the LEDs, the controller 50 communicates with one or more local controllers of the unit 20 to control the light sources 32 and/or 42. For example, a plurality of local controllers may be provided, each controlling one or more sources 32, 42 of the lighting unit 20. In some embodiments the controller 50 itself may include a plurality of local controllers, each controlling one or more sources 32 and/or 42 of the unit 20. Embodiments including multiple controllers may optionally incorporate wired and/or wireless communication between the multiple lighting controllers.

In some embodiments the light sources 32 and/or 42 may include a plurality of LED groupings each including one or more LEDs. One or more aspects of the control of each of the LED groupings may optionally be specific to the individual LED grouping. For example, the intensity, color, beam width, and/or beam direction of one or more LED groupings may be individually controlled. For example, the controller 50 may only reduce the intensity of the light output one or more LED groupings based on a determined sensed input condition, while maintaining the intensity of the light output of one or more other LED groupings. For example, the light source 32 of the portable lantern 30 when in a deployed configuration or portable mode may automatically change to a different color, intensity, or other characteristic different from when in the stowed configuration with the cradle 40. Also, for example, the controller 50 may apply lighting adjustments responsive to input via the various detection inputs to one or more LED groupings during a predefined adjustment condition such as motion detected, battery voltage, docking sensor 53, temperature and the like, while maintaining one or more other LED groupings at a reduced or extinguished light output intensity during the sensed condition or environmental detected status.

A power supply circuit 51 may also be provided within the control system 10 in order to appropriately connect and disconnect the various battery source, namely the rechargeable battery 52 and may also work in conjunction with the controller 50, or by itself, to connect or disconnect the rechargeable battery 52 upon the preset condition of the rechargeable battery 52.

As well, the motion/proximity sensors 35 may be electrically connected to the controller 50 such that an electrical signal or communication is received or detected by the controller 50 in order to modify the light output upon a detection signal from the motion/proximity detector. Standard operation of the one or more light sources will be implemented for a user-defined period of time upon detection of movement within a field of view, the field of view being the area detectable by the motion sensors in a direction in which the lens/detectors are pointed. Such range can be as little as 35 feet and up to 100 feet and be in an arc up to 240°, dependent upon the various corresponding electronics utilized. Known systems may be implemented in order to reduce the false triggers of motion, as well as preventing retriggering by implementation of a delay circuit.

As shown in FIG. 4, normal operation of the decorative light depicted in the various examples may include the lighting controller providing light output signals to operate one or more of the light sources once motion is detected. Initiating a valid 'motion' detected signal however, the unit 20 may monitor an environmental light sensor 54 which may be positioned on an exterior of the housing. Thus, the controller will monitor the light sensor 54 to determine if a 'night' condition presently exists. If the controller determines a night condition is present, determination of illumination and light control output signal generation will be conducted.

Alternatively and in various implementations, a dusk setting low level output may be determined such that one or more light sources emit light after the light sensor 54 detects a low environmental light condition, such as the setting sun. The light output from the light sources 32 and/or 42 may be maintained for a predetermined and set amount of time defined by the user and adjustable therewith based upon user input.

The controller may monitor the motion/proximity sensor in order to determine whether or not a motion condition has occurred. The monitoring of the motion detector via the output line of the motion/proximity sensor can be restricted so that it is only monitored while a valid night condition is present. The controller then may determine if both a night condition and a valid motion detection condition is present in order for the controller to initiate determination of light output signals.

The controller may determine the current mode for the one or more light sources. Such a determination can be from indication signals, such as current or voltage monitoring, weight sensor, and the like, any of which may suffice to provide a single input to the controller indicative of the portable lantern and/or cradle condition or mode.

As well, the controller may determine the current battery condition for batteries. Such determination can be by polling voltage or other power indication signals from the power supply circuit, direct signals sent from the battery supplies, voltage or current monitoring and the like, any of which may suffice to provide signal input to the controller indicative of the battery condition. Further, the system may continually, as part of a parallel or additional process, continually determine and execute the various steps of monitoring the rechargeable battery conditions for continued connection of the rechargeable battery.

As depicted, during normal operation of the decorative lantern 20 on the rechargeable batteries, the control system 10 may allow continued charging of the rechargeable batteries by detecting and monitoring the rechargeable battery voltage when in the stowed position. If and when the portable lantern is in the stowed positions with the cradle at step 130, for example, the rechargeable battery voltage is above a predefined upper limit, the control system 10 may disconnect from the rechargeable batteries at step 120 in order to discontinue recharging. If such upper limit is not detected at step 110, the control system may further determine whether or not the rechargeable battery voltage is below a lower limit. If the voltage detected from the rechargeable batteries is below the lower voltage limit, the control system through the controller, in some examples, may utilize a power supply circuit 51 will allow continued charging of the rechargeable batteries at step 122. In the portable mode, as shown in FIG. 5 when the portable lantern in a deployed configuration from the cradle, the power supply circuit 51 may power the light source 42 of the cradle 40 while the rechargeable batteries 52 may supply the light source 32 of the portable lantern 30.

As illustrated in FIG. 5, an example of the decorated operation is shown for the position of the portable lantern relative to the cradle. If, for example, the portable lantern is in the stowed position at step 130, during the mounted mode at least the portable lantern light sources 32 are illuminable having a variety of characteristics at step 132. However, in some embodiments, the cradle light source 42 may be illuminated as well in the mounted mode. The portable lantern may be illuminated by the rechargeable batteries and/or the hard wiring/AC in the mounted mode. If the portable lantern is in the deployed position or configuration at step 130, the light source 32 is illuminated from the portable lantern at step 133 as well as the light source 42 from the cradle 40 at step 142 during the portable mode. The light source of the portable lantern and/or cradle may have a variety of characteristics in the portable mode. These light characteristics of the cradle and/or portable lantern may be similar or different during their respective modes. In the portable mode, a battery (e.g. rechargeable battery) may power the portable lantern while the hard line powers the cradle at the mount location. In some embodiments, the characteristics of one or more of the light sources may be selected by the user or predetermined, or based on other conditions.

The control system 10 may include and/or access a storage subsystem containing programming and data constructs that provide the functionality of some or all of the modules described herein. For example, the storage subsystem may include the logic to perform one or more of the process or system steps of the various figures. The modules implementing the functionality of certain embodiments are generally executed by controller 50, alone or in combination with other controllers (e.g., distributed processing). Memory may be used in a storage subsystem of the control system 10 in combination with and accessible by the controller 50. Memory can include a number of memories including a main random access memory (RAM) for storage of instructions and data during program execution and a read only memory (ROM) in which fixed instructions are stored.

In some embodiments, one or more portions of the decorative lantern (e.g. cradle and/or portable lantern) may include a USB charger and/or a Blue Tooth Speaker.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A decorative lantern, comprising:
   a portable lantern having a base which is removably receivable within a recharging base, the portable lantern having a first plurality of LEDs and the recharging base having a second plurality of LEDs which are not removable;
   the recharging base having at least one electrical contact electrically coupled to at least one electrical contact of the portable lantern when the portable lantern is placed on the recharging base;
   both the portable lantern and the recharging base being in communication with each other;
   the portable lantern having a rechargeable battery in electrical connectivity with the at least one electrical contact of the portable lantern and also in electrical connectivity with the first plurality of LEDs;
   the recharging base having an electronic control system operably coupling a power supply line with the at least one electrical contact to operably charge the rechargeable battery of the portable lantern when the portable lantern is placed in a first mode of operation on the recharging base;
   the recharging base having electrically connected to the electronic control system;
   the portable lantern having electronic control circuitry to operably illuminate the first plurality of LEDs at a first illumination level in the first mode of operation;

the portable lantern electronic control circuitry operably illuminating the first plurality of LEDs at a second illumination level when in a second mode of operation indicating the portable lantern is removed from the recharging base;

wherein when in the second mode of operation the first plurality of LEDs are electrically powered by the rechargeable battery;

wherein the first illumination level for the first plurality of LEDs is greater than the second illumination level;

the electronic control system illuminating the second plurality of LEDs when the portable lantern is in the second mode of operation;

wherein the recharging base transmits a motion detection signal to the portable lantern in response to a detection of motion by the PIR when the portable lantern is removed from the recharging base;

the electronic control circuitry of the portable lantern operably illuminating the first plurality of LEDs in response to receiving the motion detection signal received from the recharging base and changing the light output characteristics of the first plurality of LEDs.

2. A decorative lantern comprising:

a portable lantern includes a first light source and one or more rechargeable batteries, the portable lantern is removably connectable between a mounted mode when coupled to a cradle and a portable mode when removed from the cradle, wherein the cradle includes a second light source and includes a proximity sensor for detecting mounting of the portable lantern to the cradle, wherein the cradle is electrically connected to a power source;

wherein when the portable lantern is in the mounted mode with the cradle, the portable lantern is electrically coupled to the power source and the first light source is illuminated;

when the portable lantern is in the portable mode, the first light source is electrically coupled to the one or more rechargeable batteries and is illuminated, and the second light source of the cradle is illuminated;

wherein when the portable lantern is in the mounted mode the first light source is illuminated and has a first color and a first intensity, and when the portable lantern is in the portable mode the first light source is illuminated and has a second color and a second intensity;

wherein one of the cradle and the portable lantern further having a motion sensor and a transmitter and upon sensing motion, sends a motion sense signal to the other of the cradle or lantern, the motion sense signal causing alteration of the light characteristics of both the first light source of the portable lantern and the second light source of the cradle.

3. The decorative lantern of claim 2 wherein when the portable lantern is in the mounted mode, the power source charges the one or more rechargeable batteries of the portable lantern.

4. The decorative lantern of claim 2 wherein the first color is different from the second color.

5. The decorative lantern of claim 4 wherein operably changing between the first color to the second color is an automatic or manual operation.

6. The decorative lantern of claim 4 wherein the first intensity is different from the second intensity.

7. The decorative lantern of claim 2 wherein the first intensity is different from the second intensity.

8. The decorative lantern of claim 2 wherein when the portable lantern is in the mounted mode with the cradle, the second light source of the cradle is non-illuminable.

9. The decorative lantern of claim 2 further comprising one or more speakers in at least one of the portable lantern and the cradle.

10. The decorative lantern of claim 2 further comprising a blue tooth connection in at least one of the portable lantern and the cradle.

11. The decorative lantern of claim 2 wherein the portable lantern includes a base and an opposing top.

12. The decorative lantern of claim 10 wherein the opposing top includes the first light source.

13. The decorative lantern of claim 10 wherein the base is received on the cradle, wherein the top is positioned away from the base.

14. The decorative lantern of claim 2 wherein at least one of the first light source and the second light source is a plurality of LEDs.

15. The decorative lantern of claim 2 wherein at least one of the first light source or second light source is capable of being automatically illuminable when the light level is low.

16. The decorative lantern of claim 1, wherein the PIR outputs a signal to the electronic control system of the recharging base that estimates a distance of a detected motion and the electronic control system of the recharging base transmits a motion detection signal to the portable lantern based on the estimated distance of the detected motion satisfying a threshold.

17. The decorative lantern of claim 2, wherein an electronic control system of the cradle is configured to operably illuminate the first light source or the second light source in response to detecting the mounting of the portable lantern to the cradle.

18. The decorative lantern of claim 2, wherein the proximity sensor comprises a docking sensor or magnets.

19. The decorative lantern of claim 2, wherein the portable lantern has one or more detectable optical indicators and the proximity sensor comprises an optical detection device capable of detecting the one or more detectable optical indicators of the portable lantern.

20. A decorative lantern comprising:

a cradle and a portable lantern which removably retained on the cradle;

the portable lantern having a first light source and one or more rechargeable batteries, the portable lantern removably connectable between a mounted mode when coupled to the cradle and a portable mode when removed from the cradle;

wherein the cradle includes a second light source and includes a proximity sensor for detecting mounting of the portable lantern to the cradle;

the first light source of the portable lantern and the second light source of the cradle each being at least one LED;

the cradle electrically connected to a power source;

the portable lantern electrically coupled to the power source when the portable lantern is in the mounted mode;

the first light source of the portable lantern electrically coupled to the one or more rechargeable batteries and illuminated when the portable lantern is in the portable mode;

wherein one of the cradle and the portable lantern have a motion sensor and a transmitter and upon sensing motion, transmitting a motion sense signal by the transmitter to the other of the cradle or lantern, the motion sense signal causing alteration of light characteristics of both the first light source of the portable lantern and the second light source of the cradle.

* * * * *

UNITED STATES PATENT AND TRADEMARK OFFICE
CERTIFICATE OF CORRECTION

PATENT NO. : 10,823,344 B2  
APPLICATION NO. : 16/234872  
DATED : November 3, 2020  
INVENTOR(S) : Kennith R. Moore et al.

Page 1 of 1

It is certified that error appears in the above-identified patent and that said Letters Patent is hereby corrected as shown below:

In the Claims

In Column 16, Claim 1, Line 63, after 'having' insert -- a PIR --, therefor.

Signed and Sealed this
Twelfth Day of January, 2021

Andrei Iancu
*Director of the United States Patent and Trademark Office*